Oct. 29, 1929.     A. J. WEATHERHEAD, JR     1,733,925
PIPE COUPLING
Filed Dec. 3, 1928
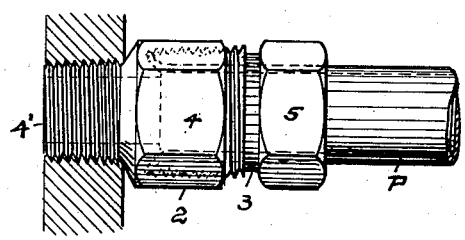
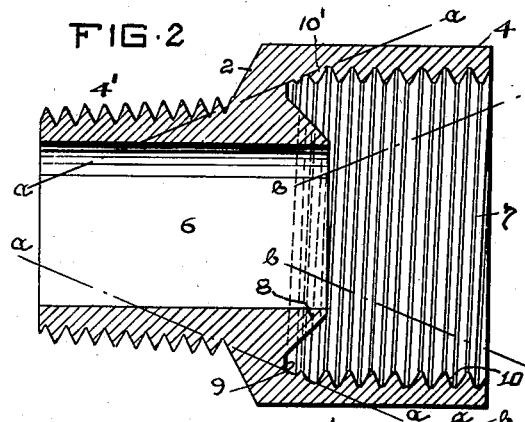
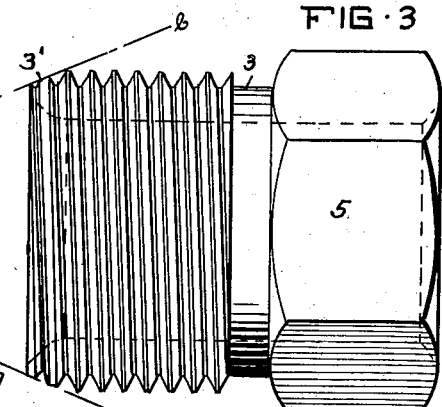
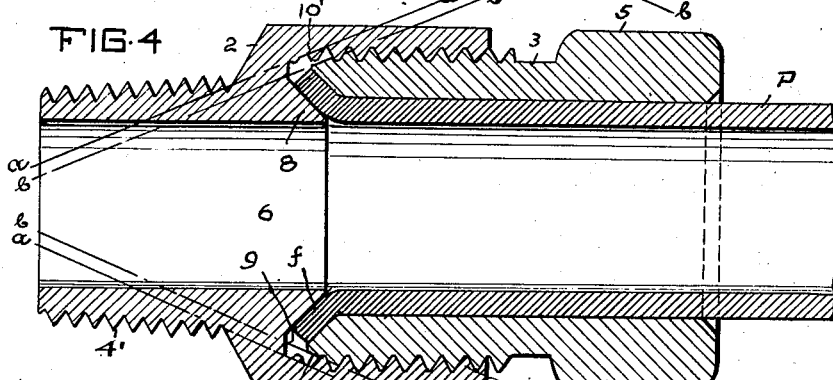
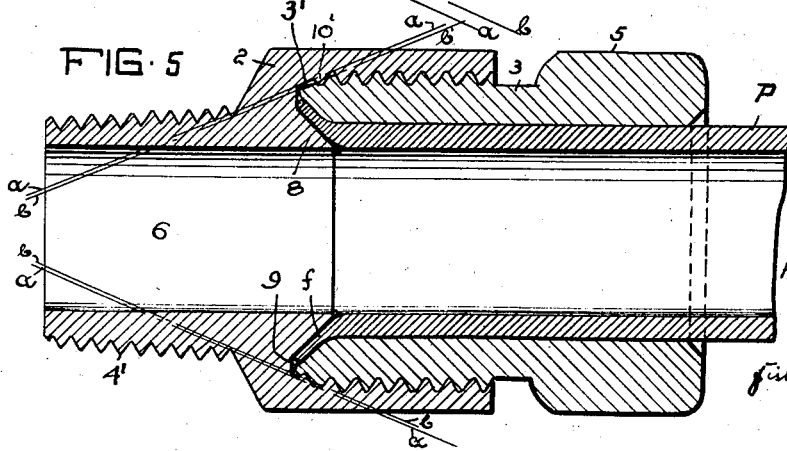
Inventor
A. J. WEATHERHEAD JR.
Attorney Patented Oct. 29, 1929

1,733,925

UNITED STATES PATENT OFFICE

ALBERT J. WEATHERHEAD, JR., OF CLEVELAND, OHIO

PIPE COUPLING

Application filed December 3, 1928. Serial No. 323,435.

My invention relates to an improvement in pipe couplings, all as herein shown and described and more concisely set forth in the claims. In general the purpose of the invention is to provide a durable and inexpensive coupling for flanged pipes, especially copper and other soft metal pipes adapted to be readily flared, for example such small copper pipes or tubes as are customarily used for conveying oil and other fluids to various appliances in motor driven vehicles. Couplings for that particular purpose are relatively small, and these small couplings are frequently disconnected to permit and expedite repairs and replacements of the pipes or the appliances or parts thereof to which they are connected. Accordingly the present coupling is designed to permit convenient connection and disconnection of the pipes or tubes without objectionable malformation or injury to the coupling members should frequent disconnection be required. The construction of the coupling itself and the steps taken to produce the same also permit rapid and cheap quantity production of such articles by automatic screw-machine operations. A fluid-tight joint for the pipe is also effectively obtained in coupling the pipe initially and also after repeated disconnections, and the coupling members are securely interlocked whenever tightly screwed together so that the vibration which attends the operation of engines or motor vehicles, will not loosen the coupling parts or permit leakage.

In the accompanying drawings, Fig. 1 is a side elevation of a pipe coupling embodying the invention, and Fig. 2 is a sectional view, greatly enlarged, of the female member of the same coupling. Fig. 3 is a side view of the male member or thimble, enlarged. Figs. 4 and 5 are similar sectional views of the coupling members joined to a flanged pipe, the flange being shown under different degrees of compression in the two views.

The invention comprises a chambered body 2, and a gland member or tubular nut 3, body 2 being screw-threaded internally and thimble 3 externally to permit these two members to be united together by rotating one or the other, each having wrench engaging portions or hexagonal enlargements 4 and 5, respectively, to facilitate holding and turning operations. In use, tubular nut 3 is sleeved upon a pipe P of copper or other soft metal, and the end of the pipe flanged before connecting the coupling members together. The thickness of the wall of the pipe may vary but the outside diameter of the pipe is about the same as the axial opening in the nut which has its entrance flared outwardly at an angle of approximately 45° in respect to the axis to permit the flange on the pipe to be engaged and compressed against a conical seat in screwing the two coupling members together. Couplings of this general type are old and well known, but I am not aware that the features hereinafter described have been incorporated in such couplings or that the same steps have been taken heretofore in producing the same.

As shown, the present coupling also includes a chambered body 2 having a screw-threaded extension 4' of reduced diameter which is tapered and screw-threaded to permit it to be attached to another object, piece or part. However, body 2 may be fashioned in other ways to permit its attachment or connection to a pipe or other object, providing a communicating passage or bore 6 of reduced diameter is present axially within the bottom of the screw-threaded cavity or chamber 7. The bottom of this cavity or chamber 7 is also formed with a smooth truncated cone 8 through which the communicating passage or bore 6 extends, and the angle of inclination of the sides of the cone is preferably 45° to correspond with the flare of flange —f— of pipe P. A cone of shallow depth or short length is employed, the base of which is of less diameter than the internal diameter of the main part of chamber 7, thereby providing a flat annular end wall 9 of narrow width at the bottom of the chamber around the base of the cone. Chamber 7 is formed with screw-threads 10 which extend the full length thereof to bottom wall 9, mainly on a straight line parallel with the axis of the chamber, except in the area around cone 8. Here the threads 10' are of graduated depth, the root diameter being on a straight converging or tapering line for a distance approximately equal to the length of truncated cone 8, say substantially as indicated by the sloping lines —a—a—, in Fig. 2. Accordingly a number of the threads are of graduated width and depth for a substantial distance opposite cone 8, although the land diameter and pitch of the threads is the same the full length of the threaded area.

The screw-threaded portion of nut 3 is straight and corresponds in diameter for a part of its length to the straight, screw-threaded portion of chamber 7, although the nose or tip portion 3' of the nut is chamfered on obtuse tapering lines corresponding to the tapered root diameter of threads 10'. Accordingly the screw-threads on the tip 3' of the nut are graduated in depth and have lands of graduated width which taper on sloping lines —b—b— parallel or substantially parallel with sloping lines —a—a—, see Fig. 3.

Several useful purposes are served in tapering and graduating the land portions of the screw-threads on the tip of the nut, and in graduating the base portions of the screw-threads on correspondingly tapered lines within chamber 3 opposite cone 8. Thus, in producing member 2 tapping operations may be effected accurately and rapidly without endangering the cone; the wall of chamber 7 can be tapped or screw-threaded its full length, including the area opposite the cone, without injury to the tap or screw-threads; tubular nut 3 can be screwed to the extreme bottom of chamber 7; the nut and body members may be made relatively short and still provide the required number of screw-threads for powerful application of pressure without shearing or mutilating the screw-threads; the reduction in length of the nut and body yields a material saving of metal and reduction in cost in quantity production operations; and shortening in length of the coupling overall, for a given diameter of pipe, permits the coupling to be used in crowded places.

In use, when the coupling members are screwed together the flange on the pipe is compressed between the cone in the famale member and the flaring seat in the nut. The inclined face of the cone and the flaring surface in the nut are parallel, and the flange assumes the same configuration when compressed in sufficient degree to produce a fluid-tight joint. In coupling a pipe for the first time the nut is not screwed into the female member beyond the need of making a fluid-tight joint and establishing tight interlocking of the screw-threads. Should severe compression strains occur in the region of the graduated screw-threads, these threads will interlock also, but without detriment or mutilating effect. Therefore the nut may be repeatedly unscrewed and also inserted without injury to the threads on either member. Moreover, the coupling members may be repeatedly connected and disconnected and still provide an absolutely fluid-tight union between the parts, as the graduated threads on the nose of the nut promote that purpose and provide clearance to permit said nose to advance beyond the apex of the cone and to the extreme bottom of the cavity should the pipe flange be compressed in increasing degree. To prevent the flange from being sheared off from the body of the pipe the nose of the nut is or may be formed, to engage the bottom of the cavity while a substantial amount of pipe stock is still under compression, see Fig. 5.

What I claim, is:

1. A screw-threaded coupling member formed with a truncated cone having a central fluid passage, including screw-threads of graduated depth adjacent said cone, in combination with a flanged pipe adapted to be clamped against said cone, and a clamping nut sleeved upon said pipe having screw-threads, including threads of graduated depth at one end complementary to the graduated threads on said first member.

2. A coupling for flanged pipes, comprising a chambered coupling member having a seating cone therein for a flanged pipe, and a fluid passage extending through said cone, the inner wall of said member being screw-threaded with threads of uniform pitch diameter, the bottom of the interspaces between the threads opposite the sides of said cone being tapered on converging lines, in combination with a tubular coupling member having screw-threads externally thereof and chamfered at one end.

3. A coupling for flanged pipes, comprising a female member which includes a walled chamber having a perforated cone at its bottom and screw-threads extending lengthwise of said chamber and of graduated tapering formation at the bottom of the threads opposite the cone, and a male member having a flared bore adapted to receive a flanged pipe and formed with external screw-threads extending to one end and reduced at said end to provide a clearance between the graduated threads in the female member and the external threads on the male member.

4. A pipe coupling, including a female member having a fluid passage and a screw-threaded chamber, including a cone at the bottom of said chamber, and screw-threads of gradually varying depth in the chamber wall opposite said cone.

5. In a flanged pipe coupling, a female member having a chamber, a clamping cone at the bottom of said chamber containing a fluid passage, said chamber having internal screw-threads of the same pitch diameter extending to the base of the cone and of gradually varying depth and bottom width opposite the cone, and a tubular male member having a flaring mouth adapted to be sleeved over a flanged pipe, said male member having screw-threads corresponding in diameter and pitch to the screw-threads in said female member, including chamfered screw-threads of graduated width and depth at the end of said male member, to provide a clearance between said members opposite the cone when the nut is screwed against the pipe flange, said cone being abruptly inclined and disposed relatively to the working faces of the screw-threads to minimize yield and distortion in the male member opposite the cone in clamping operations.

In testimony whereof I affix my signature.

ALBERT J. WEATHERHEAD, Jr.